United States Patent
Lang

(10) Patent No.: US 6,202,803 B1
(45) Date of Patent: Mar. 20, 2001

(54) OUTPUT LOAD LIMITER

(75) Inventor: David J. Lang, Rockford, IL (US)

(73) Assignee: Hamilton Sundstrand Corporation, Rockford, IL (US)

( * ) Notice: Subject to any disclaimer, the term of this patent is extended or adjusted under 35 U.S.C. 154(b) by 0 days.

(21) Appl. No.: 09/219,333

(22) Filed: Dec. 22, 1998

(51) Int. Cl.[7] ............... B60T 7/12; F16H 29/02; F16H 57/10

(52) U.S. Cl. ............... 188/134; 74/89.15; 74/424.8 R; 192/223

(58) Field of Search ............... 188/134; 192/150, 192/223, 223.1, 223.2, 223.3, 223.4; 74/89.15, 424.8 R, 424.8 NA

(56) References Cited

U.S. PATENT DOCUMENTS

| | | |
|---|---|---|
| 2,620,683 | 12/1952 | Geyer . |
| 3,898,817 | 8/1975 | Capewell et al. . |
| 3,898,890 | 8/1975 | Simmons et al. . |
| 4,318,304 | 3/1982 | Lang . |
| 4,459,867 * | 7/1984 | Jones ................... 74/89.15 |
| 4,603,594 | 8/1986 | Grimm . |
| 4,697,672 | 10/1987 | Linton . |
| 4,745,815 | 5/1988 | Klopfenstein . |
| 4,762,205 | 8/1988 | Ortman . |
| 4,887,479 | 12/1989 | Griffey . |
| 4,909,364 | 3/1990 | Grimm . |
| 4,980,591 * | 12/1990 | Takanashi et al. ........ 192/223 |
| 5,092,539 | 3/1992 | Caero . |
| 5,199,538 | 4/1993 | Fischer et al. . |
| 5,299,666 | 4/1994 | Lang et al. . |
| 5,582,390 | 12/1996 | Russ . |
| 5,630,490 | 5/1997 | Hudson et al. . |
| 5,655,636 | 8/1997 | Lang et al. . |
| 5,950,774 * | 9/1999 | Lang et al. ............ 188/134 |

* cited by examiner

Primary Examiner—Christopher P. Schwartz
Assistant Examiner—Robert A. Siconolfi
(74) Attorney, Agent, or Firm—Wood Phillips VanSanten Clark & Mortimer

(57) ABSTRACT

An output load limiter is provided in an actuator to prevent excessive drive torque from being transmitted from a primary mover through the actuator. The actuator includes a housing, an output shaft mounted for rotation in the housing about an axis, and a drive member. The output shaft includes an external, helical spline. The drive member includes an internal helical spline engaged with the external helical spline to transmit a drive torque to the output shaft. The internal and external splines have sufficient length along the axis to allow translation of the drive member along the axis relative to the output shaft between a first position where the drive member can transmit a drive torque to the output shaft to rotate the output shaft about the axis and a second position where the drive member is restrained from transmitting additional drive torque to the output shaft.

22 Claims, 2 Drawing Sheets

OUTPUT LOAD LIMITER

FIELD OF THE INVENTION

The present invention relates to output load limiters, and more particularly relates to torque limiters used to prevent transmission of potentially damaging drive torque from a primary mover to an aircraft control surface or an actuation system for an aircraft control surface.

BACKGROUND OF THE INVENTION

In the operation of modern aircraft, flight control surfaces such as slats and flaps are powered by primary movers commonly known as power drive units. Typically, the power drive units generate drive torque which is transmitted via a variety of transmission means to move the flight control surfaces in desired directions depending on the navigational and other demands placed on the aircraft. Given the importance of the flight control surfaces to the safety of the aircraft and its passengers, it is critical that the flight control surfaces be controlled by a reliable actuation system.

One problem associated with many flight control systems is that if the drive line or transmission controlling the flight control surface becomes mechanically jammed, or if flight conditions prevent movement of the flight control surface in the desired direction, the power drive unit will not stop generating torque. Rather, the power drive unit, which is normally hydraulically powered, will generate relatively high stall torque. This stall torque will be transmitted to the input shaft and gearing of the flight control surface actuator, and is often sufficiently high to detrimentally affect and potentially seriously damage the flight control surface or the flight control surface actuator.

Examples of devices that successfully prevent the transmission of excessive drive torque by sensing an axial force on an output shaft including a ball screw that drives a flight control surface are disclosed in U.S. Pat. Nos. 4,318,304 to Lang; 4,459,867 to Jones; 4,697,672 to Linton; and 5,655,636 to Lang et al., the entire disclosures of which are incorporated herein by reference. While these devices have proven quite successful for the intended purpose, there is always room for improvement. For example, because these devices sense the total output force from the actuator, the preloaded springs that sense the output force must be of sufficient size to accommodate the total output force. This tends to impede weight and size reduction of such devices.

A device that successfully prevents transmission of excessive drive torques by using a ball ramp to sense torque, rather than an axial force on an output shaft, is disclosed in U.S. Pat. No. 5,299,666 to Lang et al., the entire disclosure of which is incorporated herein by reference. Again, while this device is satisfactory for its intended purpose, there is always room for improvements. For example, the use of a ball ramp tends to restrict options for arranging components within the actuator and, also tends to limit size reduction along the rotational axis of the ball ramp.

SUMMARY OF THE INVENTION

It is therefore the primary object of the present invention to provide a new and improved output load limiter to prevent excessive drive torque from being transmitted from a primary mover through an actuator.

It is another object of the present invention to provide a load limiter that allows for the reduced weight design.

It is a further object of the invention to provide a load limiter that allows for a design that requires reduced space requirements.

At least one or more of the above objects are achieved in an actuator including a load limiter for limiting the force that is output from the actuator. The actuator includes a housing, an output shaft mounted for rotation in said housing about an axis, and a drive member. The output shaft includes an external helical spline. The drive member includes an internal helical spline engaged with the external helical spline to transmit a drive torque to the output shaft. The internal and external splines have sufficient length along the axis to allow translation of the drive member along the axis relative to the output shaft between a first position where the drive member can transmit a drive torque to the output shaft to rotate the output shaft about said axis and a second position where said drive member is restrained from transmitting additional drive torque to the output shaft.

In one form, the actuator includes a housing, an output shaft mounted for rotation in the housing about an axis and including an external helical spline, and a drive gear including an internal helical spline engaged with the external helical spline to transmit a drive torque to the output shaft. The internal and external splines have sufficient length along the axis to allow translation of the drive gear along the axis relative to the output shaft between a first position and a second position. The actuator further includes a first stop surface secured against rotation about the axis relative to the housing, and a second stop surface moveable into and out of interference engagement with the first stop surface and secured for translation along the axis with the drive gear and against rotation about the axis relative to the drive gear. The second stop surface is out of interference engagement with the first stop surface with the drive gear in the first position. The second stop surface is in interference engagement with the first stop surface with the drive gear in the second position to restrict rotation of the drive gear about the axis.

In one form, the actuator includes a housing, an output shaft, a drive gear, and first, second, third, and fourth stop surfaces. The output shaft is mounted for bi-directional rotation in the housing about an axis and includes an external helical spline. The drive gear includes an internal helical spline engaged with the external helical spline to transmit a drive torque to the output shaft. The internal and external splines have sufficient length along the axis to allow translation of the drive gear along the axis relative to the output shaft between first, second, and third positions with the first position located axially between the second and third positions. The first and third stop surfaces are secured against rotation about the axis relative to the housing. The second stop surface is moveable into and out of interference engagement with the first stop surface and secured for translation along the axis with the drive gear and against rotation about the axis relative to the drive gear. The second stop surface is out of interference engagement with the first stop surface with the drive gear in the first position. The second stop surface is in interference engagement with the first stop surface with the drive gear in the second position to restrict rotation of the drive gear in one direction about the axis. The fourth stop surface is moveable into and out of interference engagement with the third stop surface and secured for translation along the axis with the drive gear and against rotation about the axis relative to the drive gear. The fourth stop surface is out of interference engagement with the third stop surface with the drive gear in the first position. The fourth stop surface is in interference engagement with the third stop surface with the drive gear in the third position to restrict rotation of the drive gear in the other direction about the axis.

In one form, the helical splines are part of a ball spline and are engaged to each other by a plurality of ball spline balls.

In one form, the drive gear is rotatably mounted to the housing through the ball spline and the output shaft.

In one form, the actuator includes a first spring that is preloaded between the drive gear and the housing with the drive gear in the first position to generate a first desired trip force against the drive gear that must be overcome to translate the drive member from the first position toward the second position.

In one form, the actuator includes a second spring that is preloaded between the drive gear and the housing with the drive gear in the first position to generate a second desired trip force against the drive gear that must be overcome to translate the drive member from the first position toward the third position.

DETAILED DESCRIPTION OF THE PREFERRED EMBODIMENTS

Figure 1:
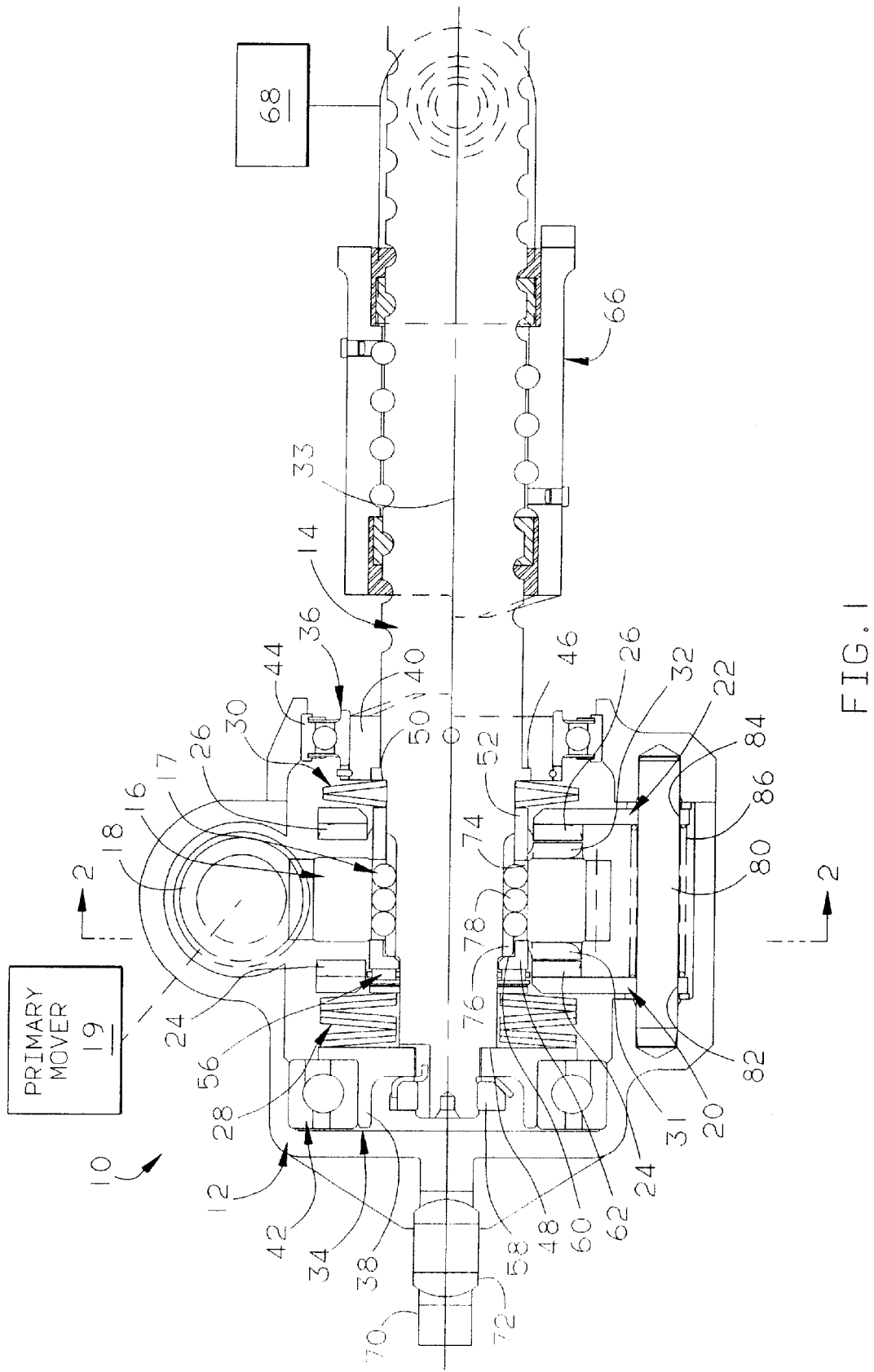
FIG. 1 is a longitudinal sectional view of an actuator embodying the present invention.

With reference to FIG. 1, an actuator 10 includes a housing 12, an output shaft 14, a drive member in the form of a helical drive gear 16, a helical ball spline 17 operably coupling the drive gear 16 to the output shaft 14 to transmit a drive torque to the output shaft 14 from the drive gear 16, an input member in the form of a worm gear 18 meshed with the drive gear 16 to transmit a drive torque to the drive gear 16 from a primary mover 19, a pair of reaction plates 20 and 22 located on opposite sides of the drive gear 16 and including a plurality of respective clutch teeth 24 and 26, a stack of springs 28 located on one side of the drive gear 16 between the drive gear 16 and the housing 12 to resist translation of the drive gear to the left in FIG. 1, and a stack of springs 30 located on the other side of the drive gear 16 between the drive gear 16 and the housing 12 to resist translation of the drive gear to the right in FIG. 1. The drive gear 16 includes a plurality of clutch teeth 31 on one side of the drive gear for selective interference engagement with the clutch teeth 24 of the reaction plate 20, and a plurality of clutch teeth 32 on the other side of the drive gear 16 for selective interference engagement with the clutch teeth 26 of the reaction plate 22.

The output shaft 14 is mounted for rotation in the housing 12 about an axis 33 by a pair of bearing assemblies 34 and 36 located on opposite sides of the drive gear 16. The bearing assemblies 34 and 36 include respective bearing mount rings 38 and 40 that mount the output shaft 14 to respective ball bearings 42 and 44. Preferably, the output shaft 14 is secured against translation relative to the housing 12 along the axis 33 by the bearing assemblies 34 and 36. While there are a number of ways to achieve this result, in the illustrated embodiment an annular shoulder 46 on the output shaft 14 that reacts loads on the output shaft 14 is directed to the right in FIG. 1 through the bearing assembly 36 into the housing 12, and a shoulder 48 on the output shaft 14 reacts loads on the output shaft directed toward the left in FIG. 1 through the bearing assembly 34 to the housing 12.

While any suitable type of spring can be used in the actuator 10, in the illustrated embodiment, the springs 28 and 30 are bellville springs. Further, while there are a number of acceptable ways to arrange the springs 28 and 30, in the illustrated embodiment the bellville springs 30 are piloted on the output shaft 14 and located axially on the output shaft 14 by a shoulder 50 of the output shaft 14. An annular spacer 52 is piloted on the output shaft 14 and sandwiched between the drive gear 16 and the bellville springs 30. The bellville springs 28 are piloted on the output shaft 14 and located axially on the output shaft 14 by the bearing mount ring 38. A needle thrust bearing assembly 56 is piloted on the shaft 14 and sandwiched between the gear 16 and the springs 28 to transmit loads between the springs 28 and the gear 16 while minimizing the rotational friction drag on the gear 16 about the axis 33 relative to the output shaft 14. The springs 28 and 30 are preloaded between the gears 16 and the housing 12 by a lock nut 58 that is threaded onto the output shaft 14. The respective preloads in the springs 28 and 30 defines the respective trip forces required to translate the drive gear along the axis 33. Depending upon the particular application, the preload in the springs 28 can be of a different magnitude than the preload of the springs 30. This can be done in a number of ways. For example, in the illustrated embodiment, the springs 28 are designed to have a different spring rate than the springs 30. By way of further example, in the illustrated embodiment, the preload on the springs 30 can be limited by the engagement of an annular shoulder 60 on the shaft 14 with an annular bearing race 62 of the needle thrust bearing assembly 56. This allows for a higher preload on the springs 28 than on the springs 30. This is often desirable because the desired load limit from the actuator 10 may depend on the direction of actuation from the output shaft 14.

While the output shaft could transfer torque to any type of mechanical element or component, in the illustrated embodiment the output shaft 14 includes a ball screw assembly 66 that can be attached to a flight control surface 68 either directly or through additional actuation mechanisms. The housing 12 includes a mount flange 70 with a spherical bearing 72 for connection with a frame or other member for reaction of forces on the housing 12.

Figure 2:
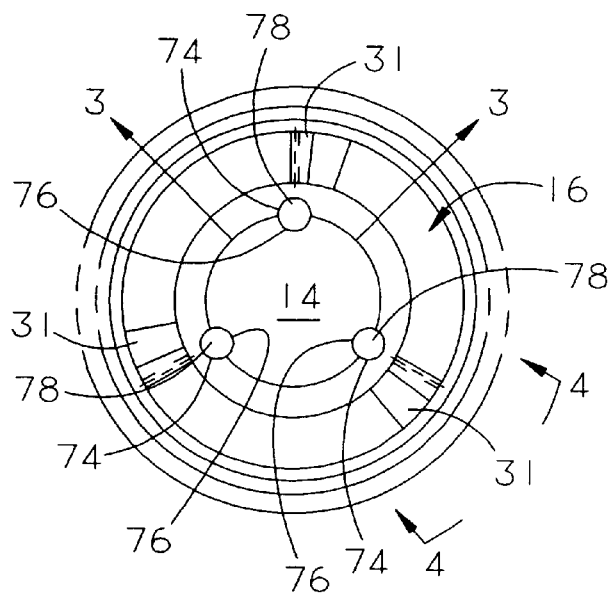
FIG. 2 is a transverse sectional view taken generally along line 2—2 in FIG. 1.
Figure 3:
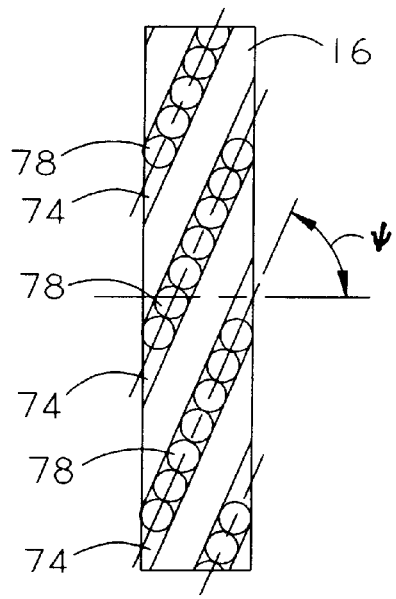
FIG. 3 is a rollout view of a helical ball spline taken generally along line 3—3 in FIG. 2.
Figure 4:
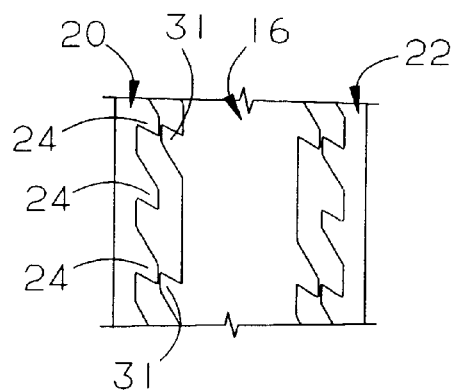
FIG. 4 is a roll-out view of a drive gear and a pair of reaction plates taken generally along FIG. 2, with the drive gear shown in a first position.

As best seen in FIGS. 2 and 3, the helical ball spline 17 includes a plurality of helical spline grooves 74 in the drive gear 16, a plurality of helical spline grooves 76 in the output shaft 14, and a plurality of ball spline balls 78 engaging the helical spline grooves 74 and 76. The helical grooves have a helix angle $\phi$ relative to the axis 33. The balls 78 are retained in the grooves 74 and 76 by the spacer 52 and the bearing race 62. The helical grooves 74 and 76 have sufficient length along the axis 33 to allow translation of the drive gear 16 between a first position shown in FIG. 4 and a second position shown in FIG. 5, and between the first position and a third position shown in FIG. 6. In the first position, the drive gear is substantially centered between the reaction plates 20 and 22, with the teeth 31 and 32 being out of interference engagement with the teeth 24 and 26. In the second position, the drive gear 16 is shifted to the left in FIGS. 1 and 5 with the clutch teeth 31 in interference engagement with the clutch teeth 24. In the third position shown in FIG. 6, the drive gear 16 is shifted to the right in FIGS. 1 and 6 with the clutch teeth 32 in interference engagement with the clutch teeth 26. While the translation of the drive gear 16 between the first, second, and third positions can be accommodated in a number of ways, in the illustrated embodiment the helical spline grooves 76 in the output shaft 14 have an extended length to accommodate this translation.

Figure 6:
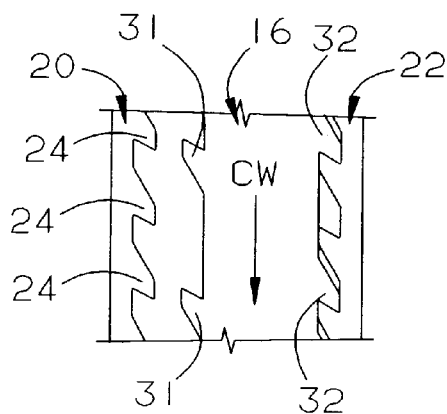
FIG. 6 is a roll-out view of a drive gear and a pair of reaction plates taken generally along line 3—3 in FIG. 2, with the drive gear shown in a third position.
Figure 5:
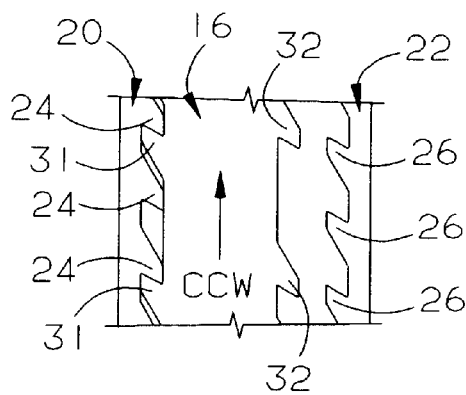
FIG. 5 is a roll-out view of a drive gear and a pair of reaction plates taken generally along line 3—3 in FIG. 2, with the drive gear shown in a second position.

One or more cylindrical pins 80 anchored in the housing 12, extending through respective apertures 82 and 84 in the plates 20 and 22, secure the reaction plates 20 and 22 against rotation about the axis 33 relative to the housing 12, while allowing translation of the reaction plates 20 and 22 along the axis 33 relative to the housing 12, the output shaft 14, and the drive gear 16. A spring 86 is piloted on the pin 80 and interposed between the plates 20 and 22 to normally bias the plates out of interference engagement with the teeth 31 and 32 on the gear 16. As best seen in FIG. 5, the teeth 24 and 31 are provided with rake angles that draw the reaction plate 20 and the drive gear 16 together when the drive gear 16 is rotated in a counter-clockwise direction in FIG. 2, and that force the reaction plate 20 and the drive gear 16 apart when the drive gear 16 is rotated in a clockwise direction. Similarly, as best seen in FIG. 6, the teeth 26 and 32 are provided with rake angles that draw the reaction plate 22 and the drive gear 16 together when the drive gear 16 is rotated in a clockwise direction in FIG. 2, and that force the reaction plate 22 and the drive gear 16 apart when the drive gear 16 is rotated in a counter-clockwise direction. This helps to insure engagement of the reaction plates 20 and 22 with the drive gear when required, and disengagement by reversing rotation after an excessive torque from the primary mover has been reacted. Thus, it can be seen that the teeth 24 and 26 define one or more stop surfaces that are secured against rotation about the axis 33 relative to the housing, while the teeth 31 and 32 define one or more stop surfaces that are movable into and out of interference engagement with the stop surfaces defined by the teeth 24 and 26 and secured for translation along the axis 33 with the drive gear 16 and against rotation about the axis 33 relative to the drive gear 16.

In operation, the drive gear 16 transmits a drive torque from the worm gear 18 to the output shaft 14 through the helical ball spline 17. The helix angle φ of the helical ball spline 17 generates an axial force on the drive gear 16 as a result of the drive torque. Depending on the direction of the drive torque, the axial force will either be toward the right or toward the left in FIG. 1. If the drive torque exceeds its desired upper limit in either direction of rotation, the axial trip force on the drive gear 16 will be sufficient to overcome the preload of the associated spring 28, 30 and will move the drive gear 16 either to the left or right depending upon the direction of rotation of the drive gear 16. This will result in the engagement of either the teeth 24 and 31 or the teeth 26 and 32, which will then assists in translation of the drive gear to either the second position or the third position, again depending upon the direction of rotation. The interference engagement of the teeth 24 and 31 in the second position, or the interference engagement of the teeth 26 and 32 in the third position, reacts excessive drive torque to the housing 12 and prevents further rotation of the drive gear 16, until the direction of rotation is reversed. After reversal of the direction of rotation of the drive gear 16, the spring 86 in combination with either the teeth 24 and 31 or the teeth 26 and 32, force separation of the drive gear 16 from either the reaction plate 20 or the reaction plate 22, again depending on the direction of rotation.

It should be understood that while the invention has been described herein in connection with one highly preferred embodiment in the form of a ballscrew actuator, the invention will find use in many forms of actuators, and accordingly, no limitation to use in connection with ballscrews, or any of the detailed features of the actuator, are intended unless expressly stated in the appended claims. For example, while the helical ball spline 17 is highly preferred for generating the axial translation force on the drive gear 16, other structures, such as a simple helical spline, can be used on the output gear 16 to generate the axial translation force. In this regard, while it is preferred that the drive gear 16 be mounted for rotation by the helical ball spline 17 and the output shaft 14, other rotational mount configurations, such as through a separate pair of bearings directly mounting the gear 16 to the housing 12, can be used. By way of further example, while it is preferred that the teeth 31 and 32 be formed as a unitary part of the drive gear 16, other arrangements are acceptable as long as the teeth 31 and 32 are secured against rotation about the axis 33 relative to the gear 16 and arranged to translate into interference engagement with the teeth 24 and 26 in response to the gear 16 translating from the first position to the second position or from the first position to the third position. As yet another example, while the clutch teeth 24, 26, 31, and 32 are preferred, other structures can be used to define stop surfaces that will react excessive drive torque from the drive gear 16 to the housing 12.

What is claimed is:

1. An actuator including a load limiter for limiting the force that is output from the actuator, the actuator comprising:

a housing;

an output shaft mounted for rotation in said housing about an axis, said output shaft including an external helical spline;

a drive member including an internal helical spline engaged with said external helical spline to transmit a drive torque to the output shaft, said internal and external splines having sufficient length along said axis to allow translation of the drive gear along said axis relative to the output shaft between a first position where the drive member can transmit a drive torque to the output shaft to rotate the output shaft about said axis and a second position where said drive member is restrained from transmitting additional drive torque to the output shaft.

2. The actuator load limiter of claim 1 further comprising a spring between said drive member and said housing to resist translation of said drive member from said first position to said second position.

3. The actuator load limiter of claim 2 wherein said spring is preloaded between said drive member and said housing with the drive member in the first position to generate a desired trip force against said drive member that must be overcome by said reaction force to translate the drive member from the first position.

4. The actuator of claim 1 wherein the splines are helical ball splines.

5. The actuator of claim 1 wherein said drive member is a gear mounted for rotation in said housing about said axis.

6. The actuator of claim 1 further comprising:

a first stop surface secured against rotation about said axis relative to said housing; and a second stop surface secured for translation along said axis with said drive member and against rotation about said axis relative to said drive member, said first stop surface abutting said second stop surface with the drive member in the second position to restrain the drive member from transmitting additional drive torque to the output shaft, said first stop surface spaced from said second stop surface with the drive member in the first position.

7. The actuator of claim 1 wherein said splines have sufficient length along said axis to allow translation of the drive member along said axis relative to said output shaft between said first position and a third position where the drive member is restrained from transmitting additional drive torque to the output shaft, and said first position is located between said second and third positions.

8. An actuator including a load limiter for limiting the force that is output from the actuator, the actuator comprising:
   a housing;
   an output shaft mounted for rotation in said housing about an axis, said output shaft including an external helical spline;
   a drive gear including an internal helical spline engaged with said external helical spline to transmit a drive torque to the output shaft, said internal and external splines having sufficient length along said axis to allow translation of the drive gear along said axis relative to the output shaft between a first position and a second position;
   a first stop surface secured against rotation about said axis relative to said housing; and
   a second stop surface movable into and out of interference engagement with said first stop surface and secured for translation along said axis with said drive gear and against rotation about said axis relative to said drive gear, said second stop surface being out of interference engagement with said first stop surface with the drive gear in said first position, said second stop surface being in interference engagement with said first stop surface with the drive gear in the second position to restrict rotation of the drive gear about said axis.

9. The actuator of claim 8 wherein said helical splines are part of a ball spline and are engaged to each other by a plurality of ball spline balls.

10. The actuator of claim 8 wherein said drive gear is rotatably mounted to said housing through said ball spline and said output shaft.

11. The actuator of claim 8 further comprising a spring between said drive gear and said housing to resist translation of said drive gear from said first position to said second position.

12. The actuator of claim 11 wherein said spring is preloaded between said drive gear and said housing with the drive gear in the first position to generate a desired trip force against said drive gear that must be overcome to translate the drive member from the first position.

13. The actuator of claim 11 further comprising a thrust bearing between said spring and said drive gear to react axial loads between said spring and said drive gear while reducing rotational friction between said drive gear and said spring.

14. The actuator of claim 8 wherein said output shaft comprises a ball screw.

15. The actuator of claim 8 wherein said output shaft is secured against translation along said axis relative to said housing.

16. An actuator including a load limiter for limiting the force that is output from the actuator, the actuator comprising:
   a housing;
   an output shaft mounted for bi-directional rotation in said housing about an axis, said output shaft including an external helical spline;
   a drive gear including an internal helical spline engaged with said external helical spline to transmit a drive torque to the output shaft, said internal and external splines having sufficient length along said axis to allow translation of the drive gear along said axis relative to the output shaft between first, second, and third positions, the first position located axially between the second and third positions;
   a first stop surface secured against rotation about said axis relative to said housing;
   a second stop surface movable into and out of interference engagement with said first stop surface and secured for translation along said axis with said drive gear and against rotation about said axis relative to said drive gear, said second stop surface being out of interference engagement with said first stop surface with the drive gear in said first position, said second stop surface being in interference engagement with said first stop surface with the drive gear in the second position to restrict rotation of the drive gear in one direction about said axis;
   a third stop surface secured against rotation about said axis relative to said housing; and
   a fourth stop surface movable into and out of interference engagement with said third stop surface and secured for translation along said axis with said drive gear and against rotation about said axis relative to said drive gear, said fourth stop surface being out of interference engagement with said third stop surface with the drive gear in said first position, said fourth stop surface being in interference engagement with said first stop surface with the drive gear in the third position to restrict rotation of the drive gear in the other direction about said axis.

17. The actuator of claim 16 wherein said helical splines are part of a ball spline and are engaged to each other by a plurality of ball spline balls.

18. The actuator of claim 16 wherein said drive gear is rotatably mounted to said housing through said ball spline and said output shaft.

19. The actuator of claim 16 further comprising a first spring between said drive gear and said housing to resist translation of said drive gear from said first position to said second position, and a second spring between said drive gear and said housing to resist translation of said drive gear from said first position to said third position.

20. The actuator of claim 19 wherein:
   said first spring is preloaded between said drive gear and said housing with the drive gear in the first position to generate a first desired trip force against said drive gear that must be overcome to translate the drive member from the first position toward the second position; and
   said second spring is preloaded between said drive gear and said housing with the drive gear in the first position to generate a second desired trip force against said drive gear that must be overcome to translate the drive member from the first position toward the third position.

21. The actuator of claim 16 wherein said output shaft comprises a ball screw.

22. The actuator of claim 16 wherein said output shaft is secured against translation along said axis relative to said housing.

* * * * *